Patented July 29, 1924.

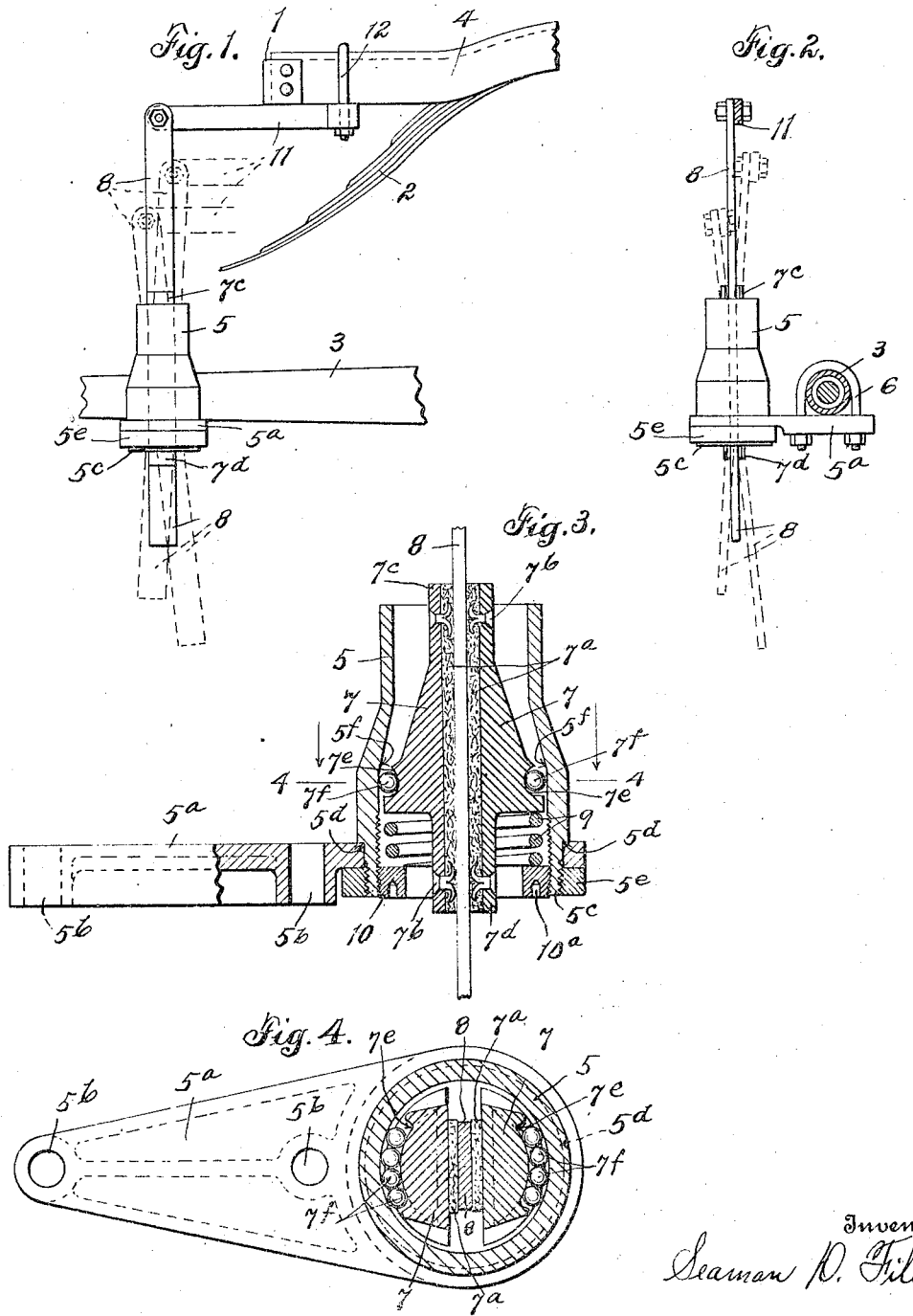

1,502,818

UNITED STATES PATENT OFFICE.

SEAMAN D. FILSON, OF CLEVELAND, OHIO.

SNUBBER FOR VEHICLE SPRINGS.

Application filed October 16, 1922. Serial No. 594,719.

*To all whom it may concern:*

Be it known that I, SEAMAN D. FILSON, a citizen of the United States, residing at Cleveland, in the county of Cuyahoga and State of Ohio, have invented certain new and useful Improvements in Snubbers for Vehicle Springs, of which the following is a specification.

My invention relates to improvements in snubbers for vehicles springs, the present embodiment relating more particularly to that class or type known as "snubber shock absorbers."

The primary object of the invention is to provide a generally improved snubber or shock absorber of the type or class indicated which will be exceedingly simple in construction, cheap of manufacture, and efficient in use.

A further and very important object is the provision of improved means of mounting and connecting the various working parts whereby a universal joint or rocking connection is provided to permit of a lateral swinging motion between the connected parts incident to the swinging movement between the vehicle chassis frame and axle members, thereby not only improving the action between the relatively moving parts but reducing the liability to breakage or distortion while in service to a minimum.

A still further object is the provision of an improved snubber or shock absorber which may be readily attached to or detached from any ordinary spring vehicle, and particularly one which may be readily adjusted to compensate for varying loads as well as to take up wear between the working parts.

There are other features of the invention residing in elemental combinations and particular construction of parts, all as will hereinafter more fully appear.

With the above mentioned and other ends in view, the invention consists in the novel construction, arrangement and combination of parts, hereinafter described, illustrated in one of its embodiments in the accompanying drawings, and particularly pointed out in the appended claims.

Referring to the drawings, forming a part of this specification, Figure 1 is a fragmentary rear elevation of the improved snubber or shock absorber as attached to the relatively movable rear axle and frame members of a vehicle of the Ford type;

Fig. 2, an end or side elevation of the same, the dotted lines in Figs. 1 and 2 illustrating the varying lateral or springing positions permitted by reason of the universal joint or rocking connection so as to permit of free lateral swinging movement between the spring connected vehicle parts.

Fig. 3, an enlarged central vertical sectional view of the same, detached, and

Fig. 4, a horizontal cross sectional view, taken on line 4—4 of Fig. 3.

Similar numerals of reference designate like parts throughout all the figures of the drawings.

The vehicle frame or chassis side bars 1, and connected spring 2, may be of any suitable and convenient form, and so likewise the vehicle axle 3, and cross bar 4, connecting the side members 1.

The main body portion or guide 5, is preferably in the specific form of a tubular casing open at its ends to removably receive and contain the relatively movable friction strap and snubber members, hereinafter referred to.

The guide block or casing 5, may be attached to the axle 3, in any suitable and convenient manner, as for example,—by means of a bracket $5^a$, provided with openings $5^b$, to removably receive and contain the ends of a U-bolt 6, which latter may surround the axle member, as shown most clearly in Fig. 2 of the drawings. In the present instance, the bracket $5^a$ is detachably connected to the lower end of the guide or casing 5 by being provided with an opening to receive a reduced exteriorally and interiorally threaded portion $5^c$, of the tubular guide 5, the reduced portion $5^c$ affording a shoulder $5^d$, to abut against and be seated upon the upper edges of the bracket surrounding the opening which receives such reduced threaded portion. As a means of securing such reduced threaded portion $5^e$, an annular nut or ring $5^e$, may be threaded thereon.

The snubbing members 7, comprise two complementary or companion parts provided with suitable lining or friction members 7ª, spaced apart a suitable distance to receive the friction strap, hereinafter referred to, said friction members 7ª being removably mounted and secured in any suitable and convenient manner, as for example,—by means of attaching elements in the specific form of split rivets or fastening element 7ᵇ.

As a means of so mounting and connecting the snubbing members 7 within the guide or casing 5 as to provide a universal joint or rocking connection to permit a relative lateral movement between the parts and particularly the relatively movable friction strap 8, the snubbing members are provided with upper and lower reduced extensions 7ᶜ and 7ᵈ, respectively, to extend through the upper and lower open ends of the guide 5 and offer the proper amount of clearance between the parts.

As a means of causing the snubbers 7 to be moved toward each other to engage and check the friction strap 8 upon sudden rebound of the vehicle body following and incident to the sudden compression of the spring between the vehicle or chassis frame and the connected axle members, the interior of the casing or guide 5 is provided with an annular constricted or bearing portion 5ᶠ to engage and cooperate with the sides of the snubbing members. As a means of lessening friction and particularly providing freedom of movement in the various relative positions of the snubber members, such snubbers 7 are provided with ball race-ways 7ᵉ, of general segmental or arcuate form, said race-ways being provided with anti-friction balls 7ᶠ.

As a means of removably mounting and adjusting the snubbing members within the guide or casing 5 as well as resiliently permitting the snubbers 7 to rock within the guide 5, a resilient or cushioning element 9 is provided, said cushioning element 9, in the present instance, comprising a coiled compression spring interposed between the base portions of the snubbing members 7 and an exteriorally threaded adjusting element or ring 10, the latter, in the present instance, being provided with openings 10ª, to receive the projections or studs of a suitable adjusting wrench.

The upper end of the friction strap 8 may be attached to the vehicle body or chassis in any suitable and convenient manner, as for example,—by means of a bracket 11, connected to the chassis bars 1 and 4, by means of suitable U-bolts or clamps 12.

By reason of the above construction, it will be obvious that upon sudden impact of the vehicle wheel against some obstruction or into some depression, the axle will be suddenly moved upwardly and in so doing the balls 7ᶠ will not be crowded inwardly toward the center through coaction with the annular constricted or upwardly inclined bearing portion 5ᶠ but will be slightly released against such coacting annular portion so that the friction strap 8 and the adjacent vehicle frame or body portion are permitted to be moved downwardly freely but immediately upon rebound the action of the spring 9 and the upward movement of the strap 8 will cause the anti-friction elements or balls 7ᶠ to crowd against the annular constricted or upwardly and inwardly inclined portion 5ᶠ and thus compress the parts 7 against the adjacent sides of the strap 8 and thus check or snub the latter together with the superposed attached vehicle frame or body part.

Having thus described one of the embodiments of my invention, without having attempted to set forth all the forms in which it may be made, or all the modes of its use, what I claim and desire to secure by Letters Patent, is—

1. A snubber for vehicle springs, comprising a tubular guide block, snubbing members mounted therein and movable vertically and circumferentially thereof, a friction strap between said snubbing members, and means for adjusting said snubbing members in said block relative to said friction strap.

2. A snubber for vehicle springs, comprising an open ended tubular guide, snubbing members vertically and laterally movable therein, a friction strap vertically and laterally movable between said snubbing members and within said guide, and means for adjusting the action of said snubbing members in said tubular guide relative to said friction strap.

3. In a snubber for vehicle springs, a guide casing provided with an annular constricted portion, snubbing members movable toward and from each other as moved against said constricted portion of said casing, anti-friction means between said snubbing members and said annular constricted portions, means for retaining said snubber members therein, a friction strap between said snubbing members, and means for regulating the sensitiveness of said snubber members in such movements.

4. In a snubber, a tubular member provided with a constricted portion, snubbing members in said tubular member provided with anti-friction means in cooperative relation to said constricted portion, means for resiliently retaining and permitting said snubbing members to rock in said tubular member, and a friction strap movable laterally and longitudinally between said snubbing members.

5. In a snubber for vehicle springs, a tubular guide provided with a constricted interior portion, snubbing members movable toward and from each other as moved in said tubular guide, means including anti-friction and cushioning elements for removably retaining and permitting said snubber members to rock in said guide, adjusting means for regulating the sensitiveness of said snubber members in such movements, and a relatively movable friction strap between said snubbing members.

6. In a snubber adapted to be interposed between relatively movable vehicle parts, a tubular casing provided with an annular constricted portion, snubbing members mounted therein and provided with anti-friction members in cooperative relation to said annular constricted portion, means for removably and resiliently retaining said snubbing members therein, a friction strap slidable between said snubbing members, and means for securing said casing and strap to said relatively movable vehicle parts.

7. In a snubber for vehicle springs, an open ended casing provided with an internal annular upwardly inclined bearing portion, snubber members vertically and laterally movable in said casing and provided with anti-friction bearings in engagement with said constricted portions, means for resiliently moving said snubbers against said constricted portions, and a friction strap interposed between said snubbing members, said casing and strap being respectively connected to relatively movable parts of the vehicle.

8. In a snubber for vehicle wheels, an open ended casing provided with an annular constricted portion, snubbing members therein provided with anti-friction balls in cooperative relation to said annular constricted portion, a spring normally holding said snubbing members in said casing, an adjusting ring mounted in the lower end of said casing for removably and resiliently retaining said spring and snubbing members in position, and a friction strap extending through the open ends of said casing between said snubbing members.

9. In a snubber for vehicle springs including a relatively movable vehicle part, an open ended vertical casing provided with an annular upwardly internal bearing portion, snubber members vertically and laterally movable therein and provided with segmentally arranged anti-friction bearings in engagement with said internal bearing portion, means for resiliently moving said snubbers against said bearing portion, and a friction strap interposed between said snubbing members and connected to said relatively movable vehicle part.

10. In a snubber, an open ended casing provided with an annular constricted portion therein, a friction strap normally extending centrally through said casing, snubbing members mounted therein and provided with segmental ball race-ways and ball bearings in cooperative relation to said constricted portion of said casing, an open adjusting member mounted in the lower end of said casing and receiving and surrounding said friction strap, and a compression spring between said open adjusting and snubbing members to normally retain said segmental ball bearings in engagement with said annular constricted portion of said casing and to permit said snubbing members and strap to have a limited rocking movement therein.

11. In combination with an open ended casing provided with an annular constricted portion, and a friction strap extending through said casing, a pair of snubbing members provided with anti-friction means in engagement with said annular constricted portion, a coiled compression spring below said snubbing members adapted to move the latter upwardly against said annular constricted portion and thereby cause said snubbing members to move inwardly against said strap, and an adjusting ring mounted in the lower end of said casing and abutting against said compression spring whereby to removably retain the latter and said snubbing blocks in position and to regulate the tension of said spring and the sensitiveness of said snubbing members.

12. In a snubber, an open ended casing provided with an interior upwardly and annular inwardly inclined bearing portion, a friction strap normally extending centrally through said open ended casing, snubbing members vertically and laterally movable therein and provided with segmentally arranged ball bearings in cooperative relation to said annular bearing portion of said casing, said snubbing members being reduced extensions arranged within the open ends of said casing, an adjusting ring in the lower open end of said casing surrounding said friction strap, and a coiled compression spring between said ring and snubbing members normally retaining said segmentally arranged ball bearings in engagement with said annular bearing of said casing and permitting said snubbing members and strap to have a limited rocking movement therein.

13. In a snubber for vehicle springs, a vertically disposed open ended casing provided on its interior with an annular upwardly inclined bearing portion, a pair of snubbing members in said casing provided with ball bearings in cooperative relation to said upwardly inclined bearing portion, resilient means normally holding said snubbing members in engagement with said annular bearing portion, a friction strap extending through said open ended casing and between said snubbing members, and an adjusting device for retaining said resilient means and snubbing members within said casing, the construction and arrangement of the parts being such as to permit said snubbing members to move vertically and laterally within said casing in cooperative relation to said annular bearing portion, said adjusting device in conjunction with said construction and arrangement of parts also serving to regulate the sensitiveness of said snubbing members in the movements thereof with respect to said friction strap.

In testimony whereof I have affixed my signature.

SEAMAN D. FILSON.